United States Patent
Gaskins et al.

(10) Patent No.: US 7,358,758 B2
(45) Date of Patent: Apr. 15, 2008

(54) APPARATUS AND METHOD FOR ENABLING A MULTI-PROCESSOR ENVIRONMENT ON A BUS

(75) Inventors: Darius D. Gaskins, Austin, TX (US); James R. Lundberg, Austin, TX (US)

(73) Assignee: Via Technologies, Inc., Taipei (TW)

(*) Notice: Subject to any disclaimer, the term of this patent is extended or adjusted under 35 U.S.C. 154(b) by 25 days.

(21) Appl. No.: 11/422,001

(22) Filed: Jun. 2, 2006

(65) Prior Publication Data

US 2007/0085560 A1 Apr. 19, 2007

Related U.S. Application Data

(60) Provisional application No. 60/727,763, filed on Oct. 18, 2005.

(51) Int. Cl.
*H03K 17/16* (2006.01)
(52) U.S. Cl. .......................... 326/30; 326/82
(58) Field of Classification Search .............. 326/26, 326/27, 30, 83–87
See application file for complete search history.

(56) References Cited

U.S. PATENT DOCUMENTS

| | | | |
|---|---|---|---|
| 5,926,031 A | 7/1999 | Wallace et al. | |
| 6,100,713 A | 8/2000 | Kalb et al. | |
| 6,160,417 A | 12/2000 | Taguchi | |
| 6,356,106 B1 | 3/2002 | Greeff et al. | |
| 6,836,143 B2* | 12/2004 | Song | 326/30 |
| 6,971,049 B2* | 11/2005 | Bakke et al. | 714/44 |
| 2003/0016550 A1* | 1/2003 | Yoo et al. | 365/63 |
| 2003/0039151 A1* | 2/2003 | Matsui | 365/195 |
| 2003/0120847 A1 | 6/2003 | Gasperik | |
| 2003/0208646 A1 | 11/2003 | Muljono | |
| 2003/0221140 A1* | 11/2003 | Bakke et al. | 714/25 |

* cited by examiner

*Primary Examiner*—Don Le
(74) *Attorney, Agent, or Firm*—Richard K. Huffman; James W. Huffman

(57) ABSTRACT

The present invention provides a technique for enabling multiple devices to be interfaced together over a bus that requires dynamic impedance controls. In one embodiment, an apparatus is provided for enabling a multi-device environment on a bus, where the bus requires active termination impedance control. The apparatus includes a first node and multi-processor logic. The first node receives an indication that a corresponding device is at a physical end of the bus or that the corresponding device is an internal device. The multi-processor logic is coupled to the first node. The multi-processor logic controls how a second node is driven according to the indication, where the second node is coupled to the bus.

19 Claims, 3 Drawing Sheets

CONVENTIONAL OUTPUT DRIVER ON ASSISTED POINT-TO-POINT BUS

MECHANISM FOR MULTI-PROCESSOR ENVIRONMENT ON POINT-TO-POINT BUS

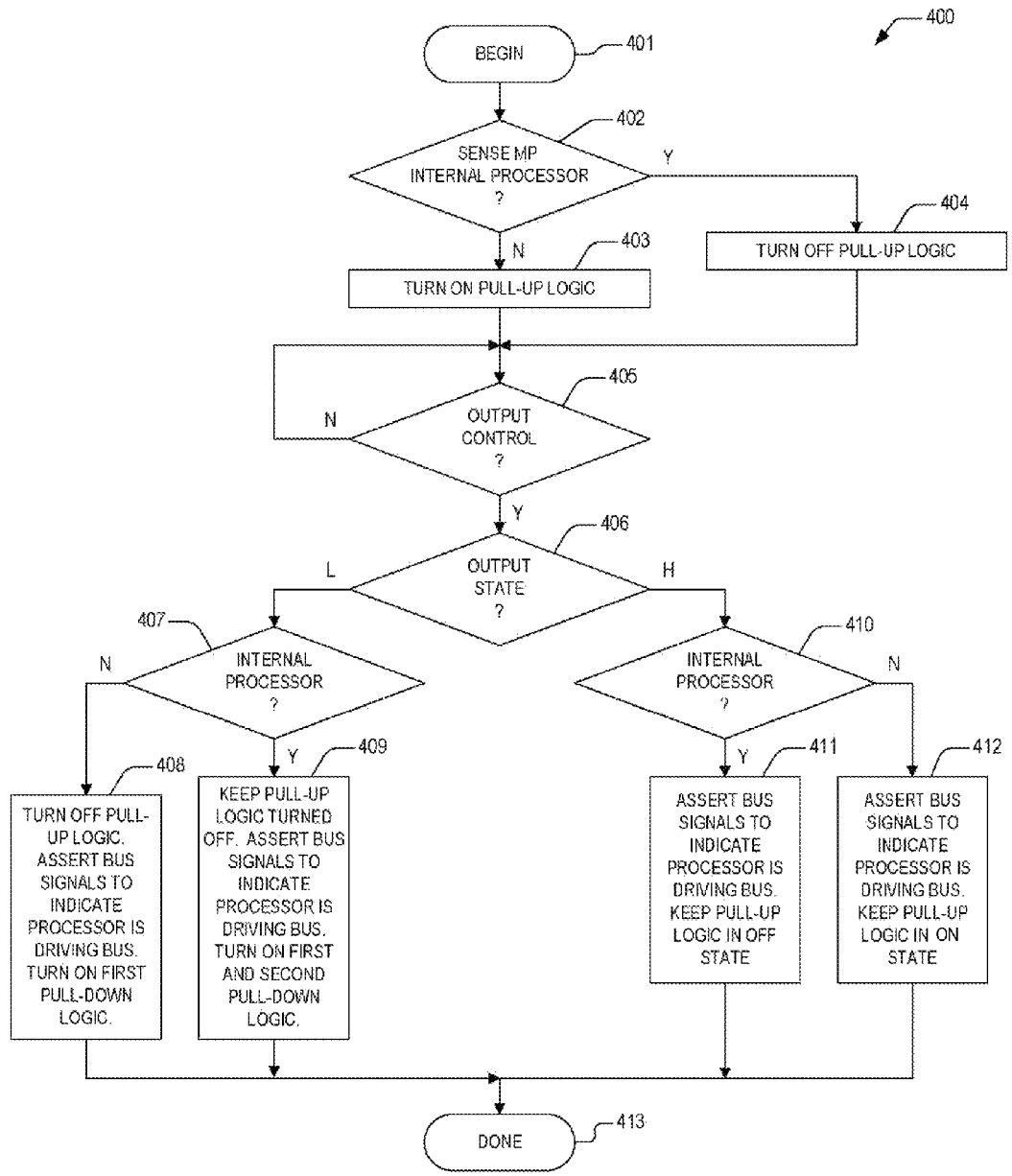

APPARATUS AND METHOD FOR ENABLING A MULTI-PROCESSOR ENVIRONMENT ON A BUS

BACKGROUND OF THE INVENTION

1. Field of the Invention

This invention relates in general to the field of microelectronics, and more particularly to a mechanism for enabling and sustaining a multi-processor environment on a bus that requires active control of bus termination impedances.

2. Description of the Related Art

Many present day bus architectures provide only for a point-to-point bus interface between two devices such as a microprocessor and its corresponding memory controller. In addition to providing only for a point-to-point interface, the architectures also require that the microprocessor (or other device) provide termination impedance control circuits within to dynamically adjust a termination impedance on the point-to-point bus, where the value of the impedance is generally selected to match the characteristic impedance of the bus itself.

In many applications, the value of the impedance is communicated to the device by coupling a precision resistor to an I/O pin on the device. Accordingly, the device provides drivers on-die that are configured to drive the point-to-point bus at the selected impedance value and at voltage levels in accordance with the bus specifications. These drivers provide for a properly terminated transmission line that has no reflections.

And while the point-to-point bus is effective for the case where only two devices communicate over the bus, the present inventors have noted for certain application areas such as a multi-processor application, more than one device may be required. In these applications, perhaps one to four processors are required to interface in parallel to a memory controller over a bus as described above.

But conventional bus architectures are limited because they require active impedance control under the presumption of fixed number of processors. For instance, the addition of another device on the bus described above would result in any given device seeing an effective termination impedance that is developed by the parallel termination impedances of the other devices on the bus and, accordingly, driving I/O signals into this effective pull-up termination impedance would result in reflections, ringing, timing displacements, and other disadvantages.

Consequently, the present inventors have observed that it is highly desirable to provide for inter-operation of a variable number of devices over a bus that requires active impedance control.

In addition, the present inventors have noted a need in the art for enabling a multi-processor environment over an actively controlled bus.

SUMMARY OF THE INVENTION

The present invention, among other applications, is directed to solving the above-noted problems and addresses other problems, disadvantages, and limitations of the prior art. The present invention provides a superior technique for enabling multiple devices to be interfaced together over a bus that requires dynamic impedance controls. In one embodiment, an apparatus is provided for enabling a multi-device environment on a bus, where the bus requires active termination impedance control. The apparatus includes a first node and multi-processor logic. The first node receives an indication that a corresponding device is at a physical end of the bus or that the corresponding device is an internal device. The multi-processor logic is coupled to the first node. The multi-processor logic controls how a second node is driven according to the indication, where the second node is coupled to the bus. The multi-processor to logic enables pull-up logic and pull-down logic if the indication indicates that the corresponding device is at the physical end of the bus. The multi-processor logic disables the pull-up logic and enables the pull-down logic if the indication designates the corresponding device as an internal device. The pull-down logic drives the second node to a prescribed low voltage level regardless of whether the pull-up logic is enabled or disabled.

In one aspect the corresponding device is a microprocessor and the first node is a pin on the microprocessor's package. The pin is coupled to a motherboard trace providing a signal indicating whether the microprocessor is internal to the bus or at the physical far end of the bus.

One feature of the embodiment calls for the multi-processor logic to control how the second node is driven by enabling pull-up logic and pull-down logic according to the indication. The pull-down logic drives the second node to a prescribed low voltage level and the pull-up logic, when enabled, generates a termination impedance as specified for the bus, where the termination impedance is generated to match a characteristic impedance of the bus.

One aspect of the present invention contemplates a microprocessor providing for a multi-device environment on a bus, where the bus requires active termination impedance control. The microprocessor has a package pin and multi-processor logic. The package pin receives an external multi-processor signal indicating whether the microprocessor is internal to the bus or at a physical end of the bus. The multi-processor logic is coupled to the package pin, and is configured to control how a pad node is driven according to the external multi-processor signal, where the pad node is coupled to the bus. The multi-processor logic disables pull-up logic and enables pull-down logic if the state of the external multi-processor signal designates the microprocessor as being internal to the bus. The multi-processor logic enables the pull-up logic and the pull-down logic if the state of the external multi-processor signal indicates that the microprocessor is at the physical end of the bus. The pull-down logic, when enabled, drives the pad node to a prescribed low voltage level when the microprocessor is coupled to a memory controller and one or more other processors via the bus.

Another aspect of the present invention comprehends a method for enabling a multi-device environment on a bus, the bus requiring active termination impedance control. The method includes, via a first node, receiving an indication that a corresponding device is internal to a bus; and responsive to the indication, controlling how a second node is driven, where the second node is coupled to the bus. The controlling includes disabling pull-up logic and enabling pull-down logic if the indication designates the corresponding device as being internal to the bus; and enabling the pull-up logic and the pull-down logic if the indication indicates that the corresponding device is at a physical end of the bus. The pull-down logic, when enabled, drives the second node to a prescribed low voltage level regardless of whether the corresponding device is internal to the bus or is at the physical end of the bus.

BRIEF DESCRIPTION OF THE DRAWINGS

These and other objects, features, and advantages of the present invention will become better understood with regard to the following description, and accompanying drawings where:

FIG. 4 is a flow chart showing a method according to the present invention for enabling a multi-processor environment over a bus.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
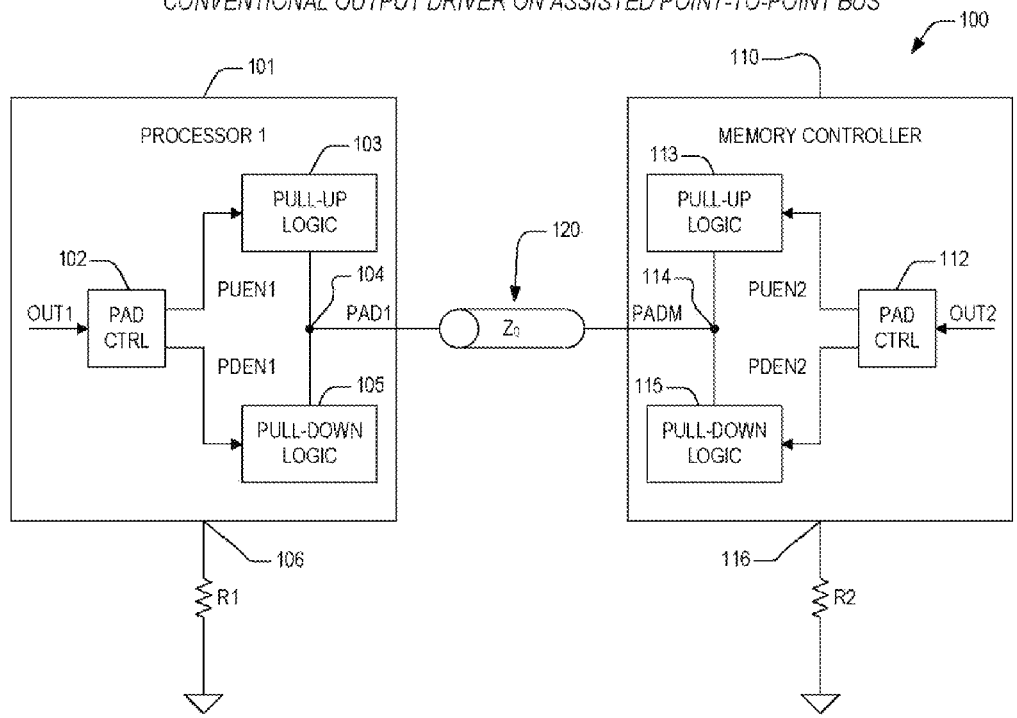
FIG. 1 is a block diagram illustrating a present day point-to-point bus that requires active control of bus termination impedances.

In view of the above background discussion on bus interfaces and associated techniques employed within present day integrated circuits for transfer of data between devices, a discussion of the problems associated with point-to-point buses will be presented with reference to FIG. 1. Following this, a discussion of the present invention will be presented with reference to FIGS. 2-4. The present invention overcomes the limitations of present day bus interface techniques by providing apparatus and methods for enabling multiple processors to be interfaced over a bus requiring active termination impedance control, while at the same time preserving the transmission line characteristics required.

Turning to FIG. 1, a block diagram 100 is presented illustrating a present day point-to-point bus 120, such as is provided for in many state-of-the-art microprocessor architectures. The block diagram depicts a present day processor 101 that is coupled to a memory controller 110 via the point-to-point bus 120. The memory controller 110 is depicted for illustrative purposes to teach limitations associated with the state-of-the-art and it is noted that any type of device (e.g., bus agent, memory hub, chipset, etc.) may be employed. A memory controller 110 is used in this discussion because it is representative of the type of device which is interfaced to a present day processor 101 over the point-to-point bus 120.

The processor 101 includes pad control logic 102 that receives a signal OUT1. The pad control logic 102 is coupled to pull-up logic 103 via a pull-up enable signal PUEN1 and to pull-down logic 105 via a pull-down enable signal PDEN1. The pull-up logic 103 and pull-down logic 105 are coupled together to form a pad node 104 developing a bidirectional pad signal PAD1. A resistor R1 is also coupled to the processor 101 at a node 106. In a present day processor 101, the node 106 typically is coupled to a pin (not shown) on a device package (not shown) of the processor to allow for ease of mounting to a motherboard or substantially similar form of packaging.

The memory controller 110 also has pad control logic 112 that receives a signal OUT2. The pad control logic 112 is coupled to pull-up logic 113 via a pull-up enable signal PUEN2 and to pull-down logic 115 via a pull-down enable signal PDEN2. The pull-up logic 113 and pull-down logic 115 are also coupled together to form a pad node 114 developing a bidirectional pad signal PADM. In like manner, a resistor R2 is coupled to the memory controller 111 at a node 116, which, like the processor 101, is typically coupled to a pin on a device package into which the memory controller 110 is encased.

The processor 101 interfaces to the memory controller 110 via the point-to-point bus 120 having a characteristic impedance $Z_0$. The interface specifically depicts signal PAD1 coupled to signal PADM (and their respective nodes 104, 114) over a single signal routing mechanism 120, shown as a transmission line 120 in the block diagram 100, but which typically comprises a trace 120 on a motherboard. For clarity purposes, nodes PAD1 and PADM are shown coupled together via the single trace 120. One skilled in the art will appreciate, however, that a present day bus 120 comprises many such signals substantially similar to those 104, 114 shown.

For certain application areas, including laptop and mobile applications, more than one processor 101 may not be required in a given system configuration. Consequently, to provide for increased system bus speeds on a present day low voltage bus 120, system bus architectures have changed in more recent years from multi-processor environments to uniprocessor environments. The uniprocessor environment, as shown in the block diagram 100, includes active on-die (i.e., "on-chip") termination impedance control features. Whereas former multi-point architectures provided for termination of a bus signal external to devices on a bus, today's bus architectures require that bus termination impedances be provided for on-die and that such termination impedances be dynamically adjusted such that they are equal to or proportional to an externally provided precision resistance, depicted by resistors R1 and R2, that is located on a motherboard or substantially similar interconnection mechanism. This externally provided precision resistance R1, R2 is indicative of the transmission line characteristic impedance $Z_0$ exhibited by a trace 120 or signal path 120 on the motherboard which interconnects the first node (i.e., pin) PAD1 of a processor 101 to the second node PADM 114 of the memory controller 110.

Conventional bus protocols prescribe a required bus termination impedance. Typically, this impedance is communicated to the processor 101 and the memory controller 110, respectively, via the external resistors R1 and R2. In most cases, these two resistors R1, R2 are equal in value, but the values may differ in some configurations. A typical value for R1 and R2 is 27.5 ohms which indicates a 55 ohm characteristic impedance $Z_0$ of the interconnecting transmission lines 120 that make up the bus. Although R1 and R2 are shown in the block diagram 100 coupled to a ground reference, one skilled in the art will appreciate that the value of the voltage reference ("VSS") to which the resistors R1-R2 are coupled may vary in accordance with the other voltages (not shown) that are provided to the processor 101 and memory controller 111 from a system power supply.

A properly terminated transmission line 120 that has no reflections has a parallel termination impedance at the far end of the signal trace 120 that is equal to the characteristic impedance $Z_O$ of the signal trace 120. Thus, in order to provide for proper terminations, the processor 101 and the memory controller 111 are required to dynamically control their respective impedances at nodes 104 and 114 as noted above such that the impedances are either equal to or proportional to R1 and R2, as prescribed by the specific bus protocol that governs the interface.

This dynamic control is typically accomplished via the pull-up logic 103, 113 and pull-down logic 105, 115 as shown. In one case, a signal on node PAD1 is active, or asserted, when it is pulled ("driven") to a specified low voltage level (not shown) through the pull-down logic 105. Accordingly, when PAD1 is asserted, a typical point-to-point bus protocol dictates that the pull-up logic 103 must be turned off. When PAD1 is not asserted, the pull-up logic 103 must be on, thus driving PAD1 up to a high voltage level (not shown). In addition, the typical protocol prescribes that only one device 101, 110—either the processor 101 or the memory controller 110—can be driving the bus 120 (i.e., pulling down the voltage on the bus 120 via pull-down logic 105, 115) at any given point in time. It is further required that the pull-up logic 103, 113 on both the processor 101 and the memory controller 110 be dynamically controlled to vary corresponding pull-up impedances such that they match the characteristic impedance $Z_O$ of the signal trace 120 on the motherboard (or other mechanism) that connects nodes PAD1 and PADM. Thus, when one of the devices 101, 111 drives the bus 120, and turns off its corresponding pull-up logic 103, 113, the driving device's pull-down logic 105, 115 generates a low going transition on the bus 120, that propagates down the transmission line environment of the signal trace 120 which is terminated at the far end by the other device's pull-up logic 113, 103.

The pull-down logic 105, 115 is configured to drive a signal on the bus 120 to the specified low voltage level. Accordingly, since the termination impedance developed by the other device 111, 101 at the far end of the bus 120 matches the characteristic impedance $Z_O$, disadvantageous transmission line effects such as ringing, reflections, etc., are precluded. In a typical embodiment, that having a 55-ohm characteristic impedance $Z_O$, the pull-down logic 105, 115 is dynamically controlled to exhibit a 27.5 ohm impedance, thus driving a high voltage level of VH to a low voltage level VL that is approximately one-third of VH. This allows the pull-down logic 105, 115 to develop a low voltage level VL that is sufficiently immune to noise on the bus 120. The manner in which the pull-down logic 105, 115 dynamically controls the impedance is beyond the scope of this application.

To summarize, on a point-to-point bus 120, when the bus 120 is not being driven low by a device 101, 110, then the device's pull-up logic 103, 113 must drive its corresponding node PAD1, PADM to a high voltage level VH according to a prescribed bus termination impedance. When a node PAD1, PADM on the bus 120 is driven low by a given device 101, 110, the given device 101, 110 must turn off its pull-up logic 103, 113 and turn on its pull-down logic 105, 115 to present a prescribed pull-down impedance. By doing so, since the opposite device's pull-up logic 113, 103 is on, the transmission line 120 is properly terminated so that there are no reflections and proper bus voltage levels VH, VL are generated.

Accordingly, when internal core signals OUT1, OUT2 are not asserted, pad control logic 102, 112 in either the processor 101 or memory controller 110 asserts pull-up logic enable signals PUEN1, PUEN2 that respectively turn on pull-up logic 103, 113 in both devices 101, 110, where the pull-up logic 103, 113 is also dynamically controlled to exhibit a termination impedance that provides for proper transmission of signals over the bus 120. In addition, the pad control logic 102, 112 also deasserts pull-down logic enable signals PDEN1, PDEN2, thus turning off respective pull-down logic 105, 115 in both devices 101, 110.

When core signal OUT1 is asserted, the pad control logic 102 in the processor 101 deasserts PUEN1, turning off the pull-up logic 103 , and asserts PDEN1, turning on the pull-down logic 105, where the pull-down logic is dynamically controlled to exhibit an impedance when driving node PAD1 104 that comports with the characteristic impedance $Z_O$ such a proper bus voltage level VL is achieved. Likewise, when core signal OUT2 is asserted, the pad control logic 112 in the memory controller 110 deasserts PUEN1, turning off its pull-up logic 113, and asserts PDEN1, turning on its the pull-down logic 115, thus propagating a correct signal level into the transmission line environment of the signal trace 120 having characteristic impedance $Z_O$.

The conventional point-to-point bus architecture is indeed effective from a performance standpoint for many applications, however, the present inventors have observed that there are numerous other application areas that benefit from the employment of multiple processors, particularly when a memory controller (or substantially equivalent bus interface device) with corresponding interface capabilities is provided as part of a multi-processor system configuration. But conventional bus architectures are limited because they require active impedance control under the presumption of fixed number of processors, as discussed above. For example, to add another processor (not shown) like processor 101 on the bus 120 described above with reference to FIG. 1 would result in any given device 101, 110 seeing an effective termination impedance that is developed by the parallel termination impedances of the other two devices 101, 110 and, accordingly, this effective pull-up termination impedance would be roughly half of the prescribed termination impedance. Consequently, the pull-down logic 105 in both of the processors 101 and the pull-down logic 115 in the memory controller 110 would not be strong enough to pull down the bus voltage because the pull-down logic 105, 115, according to protocol, is configured to develop bus voltage levels that correspond to the specified termination impedance, not to the effective termination impedance that results from the addition of the other processor like processor 101.

Therefore, it is desirable to provide an apparatus and method to enable multiple processors to interoperate over a bus. The present inventors have furthermore noted that it is desirable to provide for inter-operation of a variable number of processors over a bus requiring active impedance control.

The present invention overcomes the problems and limitations of present day bus configurations, noted above, by providing apparatus and methods for enabling the inter-operation of a variable number of processors in a multi-processor environment over a bus requiring active impedance control, yet without incurring the disadvantageous limitations described above. The present invention will now be described with reference to FIGS. 2-4.

Figure 2:
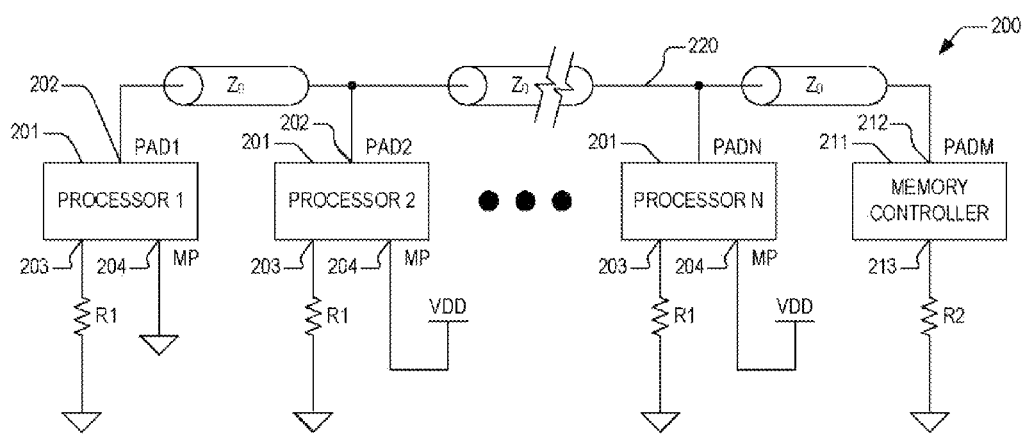
FIG. 2 is a timing diagram depicting a multi-processor environment that is enabled according to the present invention over a bus like that of FIG. 1.

Referring to FIG. 2, a block diagram is presented featuring a multi-processor environment 200 that is enabled over a bus 220 according to the present invention. The block diagram shows a plurality of processors 201 with interconnected nodes 202 developing respective bus signals PAD1-PADN. Hereinafter, the signal designators PAD1-PADN will be used to also refer to a specific one of the nodes 202. The plurality of processors 201 are also interfaced to a memory controller 211 (or substantially similar device 211) with bus interface node 212 that develops a bus interface signal PADM, substantially similar to that shown in FIG. 1. In one embodiment, a variable number of processors 201 are enabled for inter-operation with the memory controller 211 over the bus 220. In a specific embodiment, up to four processors 201 are enabled for inter-operation. Each of the processors 201 and the memory controller 211 receive a prescribed termination impedance externally via resistors R1, R2 or like manners of specifying bus termination impedance, such as has been described previously herein. In one embodiment, R1 and R2 specify a 55-ohm termination impedance and a 27.5 ohm pull down impedance for a uniprocessor bus configuration. In addition, each of the processors 201 according to the present invention includes a node 204 for receiving a multi-processor signal MP that is employed to configure a multiprocessing environment. In one embodiment, the multi-processor node 204 comprises a pin 204 on a microprocessor package, where the pin is not otherwise employed in a system configuration according to the present invention. In this embodiment, signal MP is coupled to the multi-processor pin 204. Alternative embodiments are also contemplated for coupling the multi-processor node 204 to a signal MP to configure the multi-processing environment.

To control the termination impedance of the bus 220, the processor 201 that is physically at the end of the transmission line 220 opposite the memory controller 211 has its MP node 204 tied to a first reference signal MP whose value indicates that the processor 201 is at the end of the transmission line 220 opposite the memory controller 211. In the example shown in FIG. 2, PROCESSOR 1 201 is at the physical end of the bus 220 opposite the memory controller 211 and thus, its corresponding MP node 204 is coupled to the first reference signal MP. In one embodiment, as shown in the block diagram, the value of the first reference signal is ground, or common reference value (e.g., the VSS voltage). Other values of the first reference signal are contemplated as well. And to indicate that the processors 201 between PROCESSOR 1 201 and the memory controller 211 are internal to the bus 220, that is, PROCESSOR 2 201 through PROCESSOR N 201, their corresponding MP nodes 204 are tied to second reference signals whose values indicate that the processors 201 are internal to the bus 220. In one embodiment the value of the second reference signals is VDD. Alternative embodiments for the second reference voltage comprehends substantially similar reference voltages provided for I/O devices on the bus 220. Other embodiments for indicating the physical location of processors on the bus are contemplated as well, such as multiple-pin encoding, writing internal registers via a JTAG bus (not shown), programming of machine specific registers, etc.

Because PROCESSOR 1 201 is at the far end of the bus 220, it is configured (via tying node MP 204 to ground) to dynamically control the bus pull-up termination impedance and to drive its corresponding PAD1 node 202 in substantially the same manner as is described above with reference to the processor 101 of FIG. 1. Also, as described with reference to FIG. 1, the memory controller 211 controls the bus pull-up termination impedance at its end of the bus 220 and drives its corresponding bus node PADM 212 in like manner. PROCESSOR 2 201-PROCESSOR N 201 (i.e., internal processors 201), however, drive the bus 220 differently according to the present invention because they are physically between PROCESSOR 1 201 and the memory controller 211. According to the present invention, internal processors PROCESSOR 2 201-PROCESSOR N 201 are configured via their corresponding multi-processor nodes MP 204 to turn off their pull-up logic (not shown) at all times so that the prescribed termination impedance of the bus 220 is maintained by PROCESSOR 1 201 and the memory controller 211. In addition, when one of the internal processors PROCESSOR 2 201-PROCESSOR N 201 drives to its respective bus node 202 to a low voltage value, alternative pull-down logic (not shown) therein is employed to drive the node 202 to a proper low voltage level in view of having to drive into two signal traces, each of characteristic impedance $Z_0$, with an effective impedance seen by a corresponding driver of $Z_0/2$. Thus, the alternative pull-down logic must be strong enough to drive nodes PAD2-PADN 202 to the prescribed low voltage level when driving into the two signal traces as opposed to one signal path.

Figure 3:
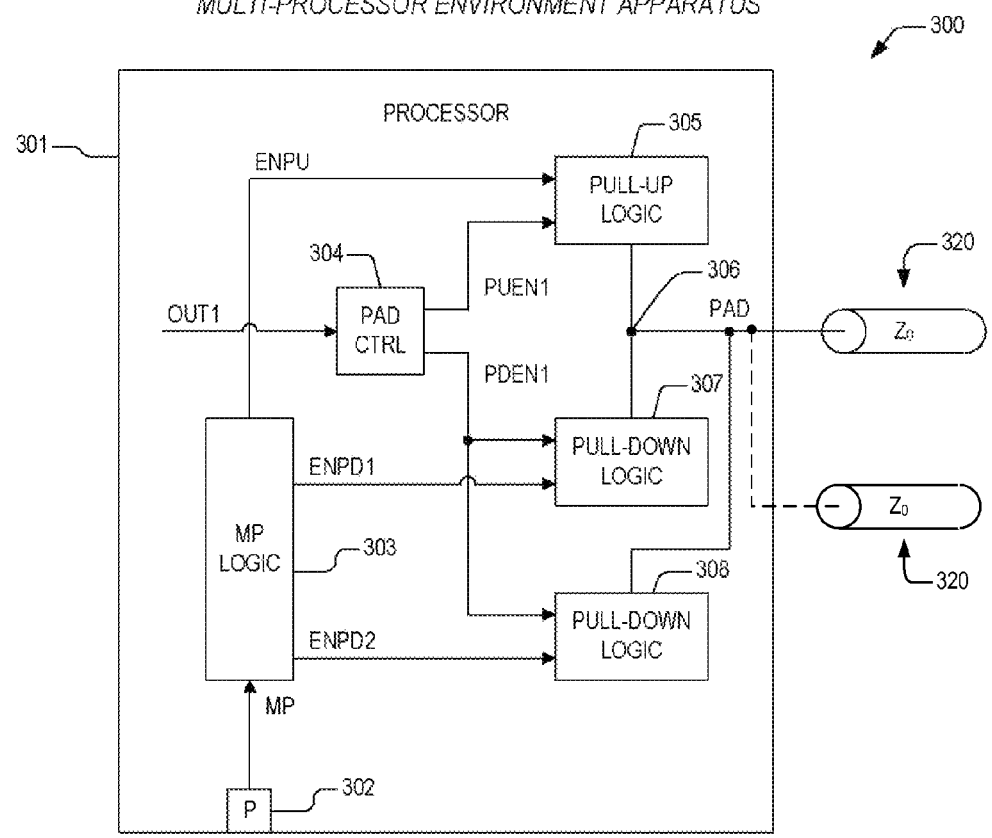
FIG. 3 is a block diagram featuring multi-processor environment apparatus within a microprocessor according to the present invention.

Now turning to FIG. 3, a block diagram 300 is presented showing multi-processor environment apparatus that is included in each of the processors PROCESSOR 1-PROCESSOR N 201 of FIG. 2. The block diagram 300 depicts a processor 301 according to the present invention, that is coupled to a bus 320, or transmission line 320, having a characteristic impedance of $Z_0$, as is described above. The microprocessor 301 includes pad control logic 304, first pull-down logic 307, and pull-up logic 305, including control signals OUT1, PUEN1, PDEN1, that operate as described above for like-named signals with reference to FIG. 1. The pad control logic 304, first pull-down logic 307, and pull-up logic 307 each comprise logic, circuits, devices, or microcode (i.e., micro instructions or native instructions), or a combination of logic, circuits, devices, or microcode, or equivalent elements that are employed to perform functions and operations as described herein. The elements employed to perform these functions and operations may be shared with other circuits, microcode, etc., that are employed to perform other functions within the processor 301. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

In addition, the apparatus includes multi-processor ("MP") logic 303 and second pull-down logic 308. A signal MP is coupled to the MP logic 303 and to a multiprocessor node P 302. As noted above, the present invention contemplates a number of embodiments for establishing a signal MP on the reference node P 302, one of which is shown in the block diagram 300. The block diagram 300 depicts node P 302 as a pin 302 on the microprocessor 301 and the value of MP is established by coupling node P 302 to a first or second reference voltage (not shown) as is describe above with reference to FIG. 2. The MP logic 303 senses the state of node P 302 (and thus, the value of signal MP as shown in the diagram 300) to determine if it is at the far end of the bus 320 or if it is internal to the bus 320. If the processor 301 is at the far end, then the MP logic 303 asserts signals ENPD1 and ENPU, that enable operation of the pull-up logic 305 and the first pull-down logic 307, as described with reference to FIGS. 1 and 2. Signal ENPD2 is deasserted, thus disabling operation of the second pull-down logic 308. A pad node 306 developing signal PAD and the bus termination impedance are thus controlled via the pull-up logic 305 and the first pull-down logic 307 as is required over a uniprocessor point-to-point environment. This configuration at the far end of the transmission line 320 provides for the actively controlled termination impedance that precludes ringing, etc., over the bus 320. The second pull-down logic 308 comprises logic, circuits, devices, or microcode (i.e., micro instructions or native instructions), or a combination of logic, circuits, devices, or microcode, or equivalent elements that are employed to perform functions and operations as described herein. The elements employed to perform these functions and operations may be shared with other circuits, microcode, etc., that are employed to perform other functions within the processor 301.

For internal processors, signal ENPU is deasserted by the MP logic 303, signal ENPD2 is asserted, and signal (i.e., node) PAD 306 is thus controlled via the first and second pull-down logic 307-308, operating in parallel. The pull-up logic 305 is disabled by the state of signal PUEN1 in an internal configuration, as indicated by the value of signal MP on node P 302. In one embodiment, the first and second pull-down logic 307-308 are configured to pull PAD 306 to a specified low voltage level VL when driving into two signal traces ("paths"), each of characteristic impedance $Z_O$. For illustrative purposes, an additional signal trace on the bus 320 is shown with dotted line connection to node 306, which corresponds to an internal processor configuration. In an alternative embodiment, the second pull-down logic 308 exhibits a strength that is different from that of the first pull-down logic 307, and the two pull-down logics 307-308 operate in parallel to achieve optimum pull down of PAD to the proper low voltage level VL.

Now referring to FIG. 4, a flow chart 400 is presented illustrating a method for enabling a multi-processor environment over a bus according to the present invention. The method begins at block 401, where a processor according to the present invention is disposed in a multi-processor environment as has been described above. Flow then proceeds to decision block 402.

At decision block 402, the processor senses a node value, signal, or other means of indication to determine whether the processor is a processor at the physical end of a bus or transmission line. If it is at the physical end of the transmission line, then flow proceeds to block 403. If the processor is an internal processor, then flow proceeds to block 404.

At block 403, pull-up logic within the processor is turned on to present a termination impedance to the bus as specified according to the bus protocol. Flow then proceeds to decision block 405.

At block 404, since the processor is physically internal to the bus, its pull-up logic that is coupled to the bus is turned off. Flow then proceeds to decision block 405.

At decision block 405, the processor evaluates an output control signal to determine if an output signal is to be presented to the bus. If not, then flow proceeds back to the beginning of the decision block 405 to monitor the output control signal until such time that it is desired to present an output on the bus. If a signal is to be presented to the bus, then flow proceeds to decision block 406.

At decision block 406, an evaluation is made to determine whether the output signal that is to be presented to the bus is to be a high voltage level H or a low voltage level L. If a low voltage level L is to the output to the transmission line, then flow proceeds to decision block 407. If the output is to be a high voltage level H, then flow proceeds to decision block 410.

At decision block 407, since a low voltage level L is to be output to the bus, an evaluation is made to determine if the processor is internal to the bus or if it is at the end of the transmission line opposite a memory hub. If the processor is not an internal processor, then flow proceeds to block 408. If the processor is an internal processor, then flow proceeds to block 409.

At block 408, since the processor is at the end of the transmission line, to output the low voltage level, the processor turns off its pull-up logic that is coupled to its output node and turns on its first pull-down logic to drive the bus to a proper low voltage level. Only the first pull-down logic is turned on because the processor is at the physical end of the transmission line. Flow then proceeds to block 413.

At block 409, since the processor is not at the end of the transmission line (i.e., the processor is an internal processor), to output the low voltage level, the processor turns off its pull-up logic that is coupled to its output node and turns on its first and second pull-down logic to drive the bus to a proper low voltage level. Both the first and second pull-down logic are turned on because the processor is not at the physical end of the transmission line and must thus drive the bus low against a first termination impedance presented by the memory hub in parallel with a second termination impedance presented by a processor that is at the physical end of the bus opposite the memory hub. Flow then proceeds to block 413.

At decision block 410, an evaluation is made to determine if the processor is internal to the bus or if it is at the end of the transmission line opposite a the memory device terminating the bus at the other end. If the processor is not an internal processor, then flow proceeds to block 412. If the processor is an internal processor, then flow proceeds to block 411.

At block 412, since the processor is at the end of the transmission line, to output the high voltage level, the processor asserts appropriate bus signals to indicate that it is driving the bus and keeps its pull-up logic on. Flow then proceeds to block 413.

At block 411, since the processor is not at the end of the transmission line (i.e., the processor is an internal processor), to output the high voltage level, the processor asserts appropriate bus signals to indicate that it is driving the bus. The bus is already pulled to a logic high level by both the memory controller and by its own pull-up logic. Flow then proceeds to block 413.

At block 413, the method completes.

As noted herein, the mechanism according to the present invention provides the advantageous characteristics of an actively terminated bus while also providing an environment for multiple processors. In addition, because only one or two devices on the bus provide for termination of the bus, smaller drivers can be employed on chip than have heretofore been provided for.

Although the present invention and its objects, features, and advantages have been described in detail, other embodiments are encompassed by the invention as well. For example, the present invention has been presented in terms related to a processor and memory controller (or substantially similar device). It is noted, however, that such examples are used to teach the present invention in a context that is familiar to many of those in the art. But the present inventors note that bus protocols and transmission line interface requirements are not specific or unique to the processor arts and as such, the present invention lends itself to application in any area where a bus interface having active impedance control requirements is specified.

In addition, the present invention has been described herein with reference to first and second pull-down logic, which operate in an internal processor in parallel to pull-down a bus that is actively terminated at both ends by other devices, the scope of the present invention is not restricted to two sets of pull-down logic equally configured. An alternative embodiment also contemplates a configuration where a second pull-down logic is employed exclusive of a first pull-down logic to pull down a bus voltage from a device that is internal to the bus. In one embodiment, the second pull-down logic is configured to pull down the bus voltage to a proper voltage level exclusive of any other device.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. An apparatus for enabling a multi-device environment on a bus, the bus requiring active termination impedance control, the apparatus comprising:
   a first node, configured to receive an indication that a corresponding device is at a physical end of the bus or that said corresponding device is an internal device; and
   multi-processor logic; coupled to said first node, configured to control how a second node is driven according to said indication, wherein said second node is coupled to the bus;
   wherein said multi-processor logic enables pull-up logic and pull-down logic if said indication indicates that said corresponding device is at said physical end of the bus; and
   wherein said multi-processor logic disables said pull-up logic and enables said pull-down logic if said indication designates said corresponding device as an internal device; and
   wherein said pull-down logic drives said second node to a prescribed low voltage level regardless of whether said pull-up logic is enabled or disabled.

2. The apparatus as recited in claim 1, wherein said first node comprises a pin on said corresponding device.

3. The apparatus as recited in claim 2, wherein said pin is located on a package of said corresponding device.

4. The apparatus as recited in claim 1, wherein said indication comprises a signal.

5. The apparatus as recited in claim 4, wherein said signal provides a voltage level to said first node.

6. The apparatus as recited in claim 1, wherein said corresponding device comprises a processor that is coupled to a memory device via the bus.

7. The apparatus as recited in claim 1, wherein said multi-processor logic controls how said second node is driven by enabling said pull-up logic and said pull-down logic according to said indication.

8. The apparatus as recited in claim 7, wherein said pull-up logic, when enabled, generates a termination impedance as specified for the bus, and wherein said termination impedance is generated to match a characteristic impedance of the bus.

9. A microprocessor providing for a multi-device environment on a bus, where the bus requires active termination impedance control, the microprocessor comprising:
   a package pin, configured to receive an external multi-processor signal indicating whether the microprocessor is internal to the bus or at a physical end of the bus; and
   multi-processor logic; coupled to said package pin, configured to control how a pad node is driven according to said external multi-processor signal, wherein said pad node is coupled to the bus;
   wherein said multi-processor logic disable pull-up logic and enable pull-down logic if the state of said external multi-processor signal designates the microprocessor as being internal to the bus; and
   wherein said multi-processor logic enables said pull-up logic and said pull-down logic if the state of said external multi-processor signal indicates that the microprocessor is at said physical end of the bus; and
   wherein said pull-down logic, when enabled, drives said pad node to a prescribed low voltage level when the microprocessor is coupled to a memory controller and one or more other processors via the bus.

10. The apparatus as recited in claim 9, wherein said external multi-processor signal is provided via a trace on a motherboard, and wherein said multi-processor signal comprises a voltage level.

11. The apparatus as recited in claim 9, wherein the microprocessor is coupled to a memory controller and one or more other microprocessors via the bus.

12. The apparatus as recited in claim 9, wherein said multi-processor logic enables said pull-up logic and said pull-down logic according to the state of said external multi-processor signal.

13. The apparatus as recited in claim 12, wherein said pull-up logic, when enabled, generates a termination impedance as specified for the bus, and wherein said termination impedance is generated to match a characteristic impedance of the bus.

14. A method for enabling a multi-device environment on a bus, the bus requiring active termination impedance control, the method comprising:
   via a first node, receiving an indication that a corresponding device is either internal to a bus or is at physical end of the bus; and
   responsive to the indication, controlling how a second node is driven, wherein the second node is coupled to the bus, said controlling comprising:
      disabling pull-up logic and enabling pull-down logic if the indication designates the corresponding device as being internal to the bus; and
      enabling the pull-up logic and the pull-down logic if the indication indicates that the corresponding device is at a physical end of the bus;
   wherein the pull-down logic, when enabled, drives the second node to a prescribed low voltage level regardless of whether the corresponding device is internal to the bus or is at the physical end of the bus.

15. The method as recited in claim 14, wherein said receiving comprises:
   coupling the indication to a pin on the corresponding device.

16. The method as recited in claim 14, wherein said coupling comprises:
   locating the pin is located on a package of the corresponding device.

17. The method as recited in claim 14, wherein said receiving comprises:
   providing a motherboard signal having a voltage level that indicates that the corresponding device is internal to the bus.

18. The method as recited in claim 14, wherein the corresponding device is a microprocessor that is coupled to a memory device via the bus.

19. The method as recited in claim 14, wherein the pull-up logic, when enabled, generates a termination impedance as specified for the bus, and wherein the termination impedance is generated to match a characteristic impedance of the bus.

* * * * *